US008428861B1

(12) United States Patent
Williams et al.

(10) Patent No.: US 8,428,861 B1

(45) Date of Patent: Apr. 23, 2013

(54) WRONG WAY DETECTION SYSTEM

(75) Inventors: Ray Williams, Missouri City, TX (US); Thuy Le, Plano, TX (US); Tracy Marks, Spring, TX (US)

(73) Assignee: Transcore, LP, Hummelstown, PA (US)

( * ) Notice: Subject to any disclaimer, the term of this patent is extended or adjusted under 35 U.S.C. 154(b) by 309 days.

(21) Appl. No.: 12/797,287

(22) Filed: Jun. 9, 2010

Related U.S. Application Data

(60) Provisional application No. 61/185,464, filed on Jun. 9, 2009.

(51) Int. Cl.
*G06F 17/10* (2006.01)

(52) U.S. Cl.
USPC .......................................................... 701/301

(58) Field of Classification Search .................. 701/301
See application file for complete search history.

(56) References Cited

U.S. PATENT DOCUMENTS

| | | | | |
|---|---|---|---|---|
| 6,084,533 | A * | 7/2000 | Morgan et al. | 340/935 |
| 7,171,294 | B2 * | 1/2007 | Kindo et al. | 701/36 |
| 2005/0235587 | A1 * | 10/2005 | Blumberg et al. | 52/236.3 |

* cited by examiner

*Primary Examiner* — Thomas Tarcza
*Assistant Examiner* — Maceeh Anwari
(74) *Attorney, Agent, or Firm* — Caesar, Rivise, Bernstein, Cohen & Pokotilow, Ltd.

(57) ABSTRACT

The Wrong Way Detection System includes detection stations deployed at each egress point along a tollway in addition to various locations along the tollway's mainline. The detection hardware communicates preferably via fiber optic network to a customized software platform housed at a centrally located Incident Management Center (IMC) of the system, where each site is monitored 24/7 in real time for wrong way vehicles. Once a vehicle is detected, operators at the IMC are able to immediately dispatch law enforcement officers and monitor the vehicle's whereabouts via CCTV cameras.

15 Claims, 1 Drawing Sheet

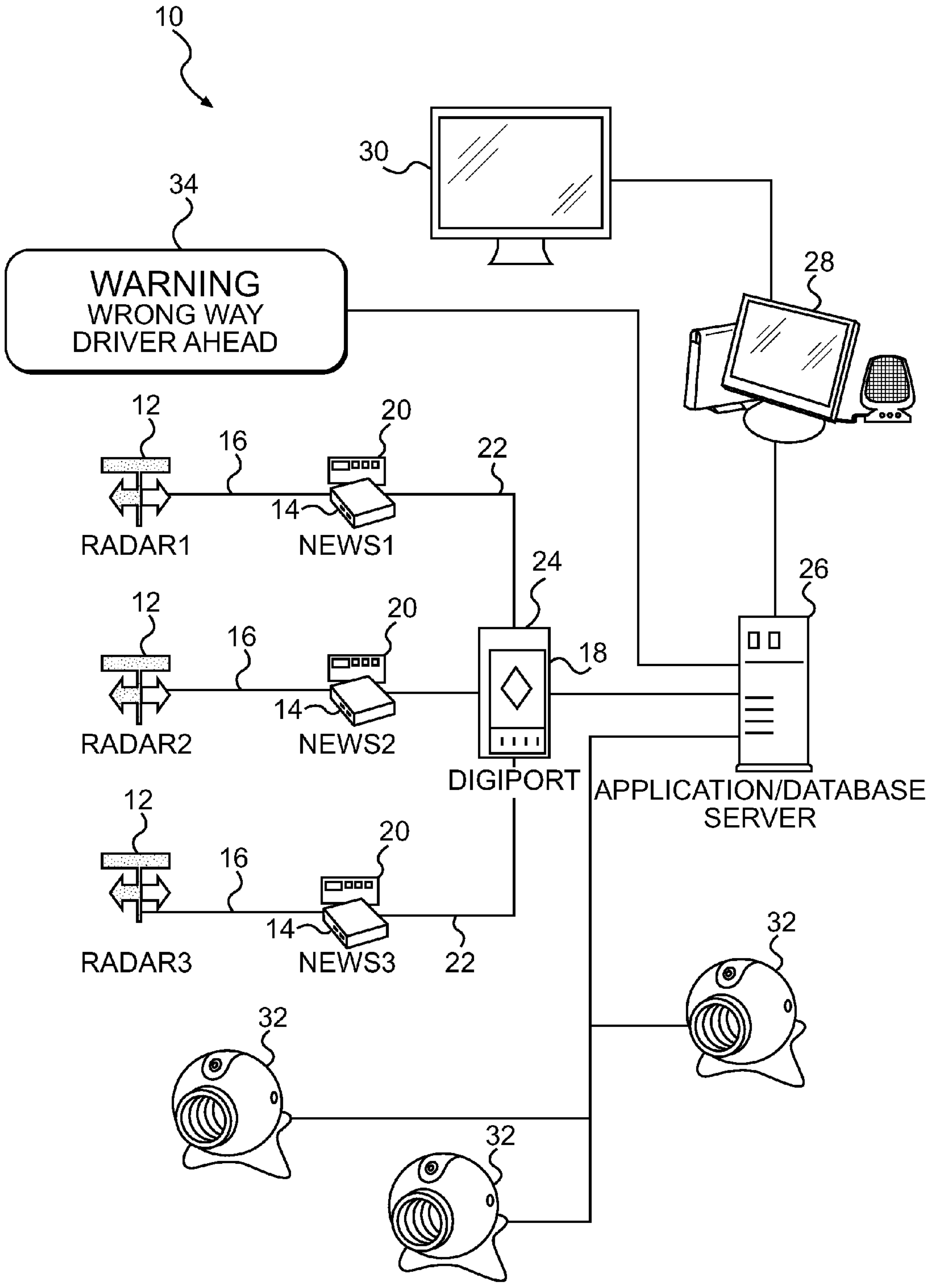
10
30
34
WARNING
WRONG WAY
DRIVER AHEAD
28
12
20
16
22
14
RADAR1
NEWS1
24
26
12
20
16
18
14
RADAR2
NEWS2
DIGIPORT
APPLICATION/DATABASE
SERVER
12
20
16
14
RADAR3
NEWS3
22
32
32
32

WRONG WAY DETECTION SYSTEM

CROSS-REFERENCE TO RELATED APPLICATIONS

This utility application claims the benefit under 35 U.S.C. §119(e) of Provisional Application Ser. No. 61/185,464 filed on Jun. 9, 2009 entitled WRONG WAY DETECTION SYSTEM and whose entire disclosure is incorporated by reference herein.

BACKGROUND OF THE INVENTION

1. Field of Invention

This invention relates to motorist safety, in particular with motorist safety within the toll industry.

2. Description of Related Art

Motorist oftentimes face unique roadway geometries and signage on tollways versus connecting freeways and state highways. One of these unique scenarios is present for example on the Westpark Tollway, where the absence of frontage roads requires tollway exit ramps to intersect at-grade with signalized intersections. As a result, motorists face unique configurations and alignments along the corridor, which is atypical for the Houston region and along Texas and national highways. Toll authorities are regularly confronted with unique operational issues and are required to solve problems without precedent to follow.

Due to multiple fatalities caused by wrong way drivers along the Westpark Tollway, the inventors conceived and reduced to practice a solution to reliably detect vehicles traveling or entering the tollway in the wrong direction. As a result, the inventors designed a system based on best-fit technology and extreme reliability after evaluating and testing multiple leading-edge technologies.

All references cited herein are incorporated herein by reference in their entireties.

BRIEF SUMMARY OF THE INVENTION

The Wrong Way Detection System by example includes detection stations deployed at ingress/egress points along a roadway (e.g., tollway, expressway, highway, limited access road, restricted access road, high occupancy vehicle lanes, parkway, road) in addition to various locations along the tollway's mainline. The detection hardware communicates preferably via fiber optic network to a customized software platform housed at a central location, such as an Incident Management Center (IMC), where each site is monitored 24/7 in real time for wrong way vehicles. Once a vehicle is detected, operators at the IMC are able to immediately dispatch law enforcement officers and monitor the vehicle's whereabouts via CCTV cameras.

In an example of the preferred embodiments, the invention includes a detection system for detecting vehicles traveling the wrong way along a roadway. The detection system includes wrong way detection stations at a plurality of detection sites, a detection communicator at each detection site, a receiver terminal and a special purpose computer at a central location. At least one of the plurality of wrong way detection stations is deployed at a corresponding one of a plurality of detection sites adjacent a roadway, with each wrong way detection station monitoring a lane of the roadway for vehicles traveling the wrong way along the lane. The wrong way detection stations detect a vehicle traveling the wrong way along the lane and transmit a wrong way alert upon the detection. The detection communicator at the detection site with the wrong way detection station that transmitted the wrong way alert is communicatively coupled to the wrong way detection station to receive the wrong way alert. The detection communicator transmits an alarm signal based on the wrong way alert. The receiver terminal located at the central location receives the transmitted alarm signal from the detection communicator as a wrong way detection alarm message. The special purpose computer is communicatively coupled with the receiver terminal and is programmed by computer programming software to interface with the receiver terminal to detect the wrong way detection alarm message and monitor the vehicle traveling the wrong way that was detected by the wrong way detection station. The special purpose computer communicates the wrong way traveling vehicle whereabouts to enforcement personnel as needed.

Further scope of applicability of the present invention will become apparent from the detailed description given hereinafter. However, it should be understood that the detailed description and specific examples, while indicating preferred embodiments of the invention, are given by way of illustration only, and that the invention is not limited to the precise arrangements and instrumentalities shown, since the invention will become apparent to those skilled in the art from this detailed description.

BRIEF DESCRIPTION OF THE DRAWING

The invention will be described in conjunction with the following drawing in which like reference numerals designate like elements, and wherein:

FIG. 1 is a schematic view of an exemplary wrong way detection system in accordance with the preferred embodiments of the invention.

DETAILED DESCRIPTION OF THE INVENTION

The present invention will now be described with reference to the accompanying drawing, in which an example of the preferred embodiments of the invention is shown. This invention may, however, be embodied in many different forms and should not be construed as limited to the examples set forth below. Rather, the exemplary embodiments are provided so that this disclosure will be thorough and complete, and will fully convey the scope of the invention to those skilled in the art.

In steps that reduced the invention to practice, the inventors designed, constructed, and integrated fourteen (14) exemplary wrong way detection sites at each egress point and mainline plaza location along the Westpark Tollway in Harris County, TX using radar based technology due to its reliable, cost effective, and readily deployable solution. Fiber optic cabling links each site in real-time to the Incident Management Center (IMC) for a redundant and robust communications network. After establishing this connectivity, each vehicle detection site was rigorously tested.

During use of the exemplary system, dispatchers at the IMC monitor the detection sites nonstop on a video display (e.g., a 3'×2' video wall, monitor) via a general purpose computer transformed to a special purpose computer programmed to perform a customized software platform that the inventors reduced to practice using Java programming and a SQL server database. The platform also interfaces with a Geographic Information System (GIS) database and displays a real-time status of each site on the video wall system map. When a wrong way vehicle is detected, an audible alarm is sounded in the IMC and the nearest roadway cameras are panned toward the tollway segment where the detection occurred.

To further enhance system reliability, the inventors developed computer programming software that transforms computers/servers in the system into special purpose computers programmed to perform the software to interface with the field hardware to test and confirm the operational status of each site and that each site is properly detecting vehicles at all times. If the special purpose computer(s) of the system performing the software detects that either site communications or hardware is malfunctioning, the system notifies dispatchers that mobilize technicians to repair the problem. All incidents are logged and tracked via the GIS within the SQL server database for historical tracking purposes and resolution. The system displays warning messages on Dynamic Message Signs (DMS) along the tollway to alert oncoming traffic of approaching wrong way vehicles.

This exemplary deployment represents a first-of-its-kind wrong way vehicle detection system, covering more than 10 miles of the United States' first all-electronic tollway. During its use, the detection system and associated response protocol has been credited with stopping numerous wrong way drivers before a potentially fatal accident could have occurred. The results of this project are truly immeasurable. By stopping the wrong way drivers, the exemplary wrong way detection system has already saved the lives of countless individuals and a lifetime of tragedy for their families. Since the exemplary wrong way detection system has been installed, no accidents have occurred as a result of wrong way drivers.

After rigorously testing the reliability and accuracy of various technologies, the inventors selected a readily deployable technology. Wrong way detection stations were designed and deployed at each egress point along the Westpark Tollway in addition to various locations along the tollway's mainline, for a total of fourteen (14) separate detection sites. The detection hardware communicates preferably via fiber optic network to a customized software platform housed at the Incident Management Center (IMC), where each site is monitored continuously in real time for wrong way vehicles. Once a vehicle is detected, operators at the IMC are able to immediately dispatch law enforcement officers and monitor the vehicle's whereabouts via CCTV cameras based on the information provided by the system.

While not being limited to a particular theory, FIG. 1 depicts an exemplary hardware configuration for the Wrong Way Detection System. The system 10 includes a plurality of radar detectors 12 (e.g., Electronic Integrated System Inc. (EIS) X3) at a plurality of remote detection sites as detection stations mounted in overhead configuration preferably above or adjacent a monitored road with an unobstructed line of sight of the monitored road, with each radar detector responsible for detecting movement along a single lane. Therefore, for efficiency and precision, one radar detector 12 is mounted per lane, with each lane generally being about twelve feet wide. At each remote detection site, wrong way detection stations (e.g., radar detectors 12) communicate wrong way alerts to a communication controller 14, preferably via a wired connection 16 upon detection of a vehicle moving the wrong way through the detection zone of the detection station. For example, a 6 pair cable with a Military Specification (MS) connector that links an EIS radar to an EIS Notification Event Warning System (NEWS) Controller in National Electrical Manufacturer's Association (NEMA) 4R cabinet with a hardened Uninterruptible Power Supply (UPS) back-up. Each communication controller 14 is communicatively connected to a receiver/port terminal server 18 (e.g., digital port terminal) via a fiber optic data transceiver 20 that converts or decodes the communication controller wrong way detection alarm messages from RS232 to fiber optic and transmits the data as an alarm signal over fiber optic cable 22 (e.g., single mode) to the receiver/port terminal server via a fiber optic data receiver 24 connected to the server 18.

It is contemplated that the system equipment at each remote detection site includes detection stations (e.g., radar detectors 12, radar guns, electromagnetic, RFID, signal strength measuring device, equipment for detecting movement of a vehicle), and a wrong way detection communicator (e.g., communication controller 14, data transceiver 20, transmission lines such as wire, fiber optic cable, wireless, equipment communicating data from the detection stations to a special purpose computer). In this example, the remote detection site's detection equipment includes the radar detectors 12, the communication controller 14 and the data transceiver 20 assigned to detect vehicles traveling through the detection site's interrogation zone of the roadway. While each detection site preferably includes one communication controller and data transceiver for all of the radar detectors at that detection site, the scope of the invention is not so limited as the number of radar detectors, communication controllers and data transceivers for each detection site is based on the configuration and number of lanes at the detection site, as well as any limitations of the specific detection stations and detection communicators at the detection site.

Each radar detector 12 is assigned to a specific one of the communication controllers 14 and assigned to a specific communication port on the receiver/port terminal server 18. For example, as can be seen in FIG. 1, radar detector #1 (e.g., Radar 1) is assigned to communication controller #1 (e.g., NEWS1), which is assigned to communication port 1 on the receiver/port terminal server 18 (e.g., Digi port).

As noted above, it is contemplated that each detection site includes a plurality of radar detectors 12 with one or more detectors assigned to monitor one or more predetermined lanes along a section of a monitored road. It is also understood that while each radar detector 12 is assigned to a specific communication controller 14, a plurality of radar detectors at a detection site are preferably assigned to the same commutation controller at that detection site for cost efficiency. In other words each communication controller preferably is communicatively coupleable with more that one, and most preferably with all of the radar detectors at a single detection site, and is configured to distinguish each assigned radar detector in order to identify and communicate the source radar detector of any wrong way alarm, and thus the associated specific monitored lane of every wrong way motorist.

The receiver/port terminal server 18 (also referred to as the receiver terminal) communicates with an application/database server 26 located preferably at a central location, such as the Incident Management Center, and communicates with a workstation computer 28 at the Center as needed to execute the software. While not being limited to a particular theory, the receiver/port terminal server 18 preferably is also located at the Center for communication with the application/database server 26. However it is understood that the receiver/port terminal server 18, the fiber optic data receiver 24, the application/database server 26 and the workstation computer 28 are not limited to any one location. What is contemplated by the inventors within the scope of the invention is that the servers and workstation computer are configured to communication with each other regardless of their location. Having the equipment at one location is considered most efficient and thus preferable for the examples discussed herein, even if the scope of the invention is not so restrictive. It is also understood that while the examples of the preferred embodiments discussed herein set forth a wired/cable connection between the various equipment, the invention also includes the use of wireless connections between the equipment as would readily be understood by a skilled artisan.

At the central location of the exemplary embodiment, the fiber optic receiver 24 is communicatively connected to the receiver/port terminal server 18 to convert RS232 serial output alarm signals to Ethernet as needed. The software or computer program running on the special purpose computers of the application/database server 26 and the workstation computer 28 (hereinafter also referred to collectively as an exemplary special purpose computer) pings the receiver/port terminal server 18 every time interval (e.g., 3 seconds, 10 seconds, one second) to detect specific wrong way messages sent from the communication controller 14. If an appropriate message is received and confirmed, the receiver/port terminal server 18 sends an Ethernet signal to a database (e.g., SQL) in the application/database server 26 that populates the appropriate fields in the database accordingly.

During operation of the system 10, when a vehicle enters a monitored lane traveling in the wrong direction, a radar detector 12 configured to monitor the lane alerts its assigned communication controller 14, which outputs a corresponding wrong way detection alarm message to the receiver/port terminal server 18 and the application/database server 26. The server 26 running the computer program receives the wrong way alert message and determines the location of the wrong way alert. While not being limited to a particular theory, the code below represents an exemplary computer program segment for receiving the alert and determining the location of the source of the alert.

```
WWDMain.java
package com.tcore.hctra.wwd;
import java.sql.CallableStatement;
import java.sql.Connection;
import java.sql.ResultSet;
import java.sql.SQLException;
import java.util.ArrayList;
import java.util.concurrent.ExecutorService;
import java.util.concurrent.Executors;
import org.apache.log4j.Category;
import com.tcore.util.DataAccessor;
public class WWDMain
{
  static Category log =
Category.getInstance("com.tcore.hctra.wwd.WWDMain");
  public static void main( String[ ] args )
  {
    String filename="buzzthruloud.wav";
    if(args != null && args.length > 0)
    {
      filename = args[0];
    }
    Connection con = null;
    CallableStatement cstmt = null;
    ResultSet rs = null;
    String query = "{call SelectDetectorsToMonitor( )}";
    ArrayList detectorPorts = null;
    try
    {
      con = DataAccessor.getConnection( );
      cstmt = con.prepareCall(query);
      log.debug("executing query to get detectors configured
for monitoring...");
      rs = cstmt.executeQuery( );
      if(rs.next( ))
      {
        log.debug("found detectors configured for
monitoring...");
        detectorPorts = new ArrayList( );
        rs.beforeFirst( );
      }
      else
```

-continued

```
      {
        log.debug("no detectors found for monitoring...");
      }
      while(rs.next( ))
      {
        log.debug("adding port "+rs.getString("ComPort")+"
to the detector list");
        LocationComportMapping mapping = new
LocationComportMapping( );
        mapping.setComPort(rs.getString("ComPort"));
        mapping.setLocationID(rs.getString("LocationID"));
        detectorPorts.add(mapping);
      }
    }
    catch(SQLException e)
    {
      e.printStackTrace( );
    }
    catch(Exception e)
    {
      e.printStackTrace( );
    }
    finally
    {
      DataAccessor.close(cstmt,rs,con);
    }
    if(detectorPorts != null && detectorPorts.size( ) > 0)
    {
      log.debug("found "+detectorPorts.size( )+"detectors to
monitor...");
      ExecutorService threadExecutor =
Executors.newFixedThreadPool(detectorPorts.size( )+1);
      for(int i=0; i<detectorPorts.size( ); i++)
      {
        log.debug("creating thread for detector running on
"+detectorPorts.get(i));
        LocationComportMapping mapping =
(LocationComportMapping)detectorPorts.get(i);
        WWDThread task = new
WWDThread(mapping.getComPort( ), mapping.getLocationID( ));
        log.debug("executing thread for
"+detectorPorts.get(i));
        threadExecutor.execute(task);
      }
      log.debug("starting the play wave thread...");
      PlayWave audioAlarm = new PlayWave(filename);
      threadExecutor.execute(audioAlarm);
    }
  }
}
LocationComportMapping.java
package com.tcore.hctra.wwd;
public class LocationComportMapping
{
  private String comPort = null;
  private String locationID = null;
  public String getComPort( ) {
    return comPort;
  }
  public void setComPort(String comPort) {
    this.comPort = comPort;
  }
  public String getLocationID( ) {
    return locationID;
  }
  public void setLocationID(String locationID) {
    this.locationID = locationID;
  }
}
```

The special purpose application/database server 26 listens to the receiver/port terminal server 18, preferable on its serial port, for any wrong way alert message sent from the communication controllers 14. While not being limited to a particular theory, the code below represents an exemplary computer program segment for directing the application/database server to listen for wrong way alert messages.

```
WWDThread.java
package com.tcore.hctra.wwd;
import java.io.IOException;
import java.io.InputStream;
import java.sql.CallableStatement;
import java.sql.Connection;
import java.sql.ResultSet;
import java.sql.SQLException;
import java.util.Enumeration;
import java.util.TooManyListenersException;
import javax.comm.CommPortIdentifier;
import javax.comm.PortInUseException;
import javax.comm.SerialPort;
import javax.comm.SerialPortEvent;
import javax.comm.SerialPortEventListener;
import javax.comm.UnsupportedCommOperationException;
import com.tcore.util.DataAccessor;
import com.tcore.util.DataValidator;
public class WWDThread implements Runnable, SerialPortEventListener
{
    CommPortIdentifier portId;
    Enumeration portList;
    InputStream inputStream;
    SerialPort serialPort;
    Thread readThread;
    StringBuffer readBuffer = new StringBuffer( );
    String defaultPort = “COM1”;
    String newsHubID = null;
    public void init( )
    {
        boolean portFound = false;
        // determine the name of the serial port on several operating
systems
        System.out.println(“Set default port to ”+defaultPort);
        // parse ports and if the default port is found, initialized
the reader
        portList = CommPortIdentifier.getPortIdentifiers( );
        while (portList.hasMoreElements( ))
        {
            portId = (CommPortIdentifier) portList.nextElement( );
            if (portId.getPortType( ) ==
CommPortIdentifier.PORT_SERIAL)
            {
                if (portId.getName( ).equals(defaultPort))
                {
                    System.out.println(“Found port:
”+defaultPort);
                    portFound = true; break;
                }
            }
        }
        if (!portFound)
        }
            System.out.println(“port ” + defaultPort + “ not
found.”);
        }
    }
public WWDThread(String comPortNo, String location)
{
        this.defaultPort = comPortNo;
        this.newsHubID = location;
        init( );
        try
        {
            serialPort = (SerialPort) portId.open(“SimpleReadApp”,
2000);
        }
        catch (PortInUseException e) { }
        try
        {
            inputStream = serialPort.getInputStream( );
        }
        catch (IOException e) { }
        try
        {
            serialPort.addEventListener(this);
        }
        catch (TooManyListenersException e) { }
        //     activate the DATA_AVAILABLE notifier
        serialPort.notifyOnDataAvailable(true);
```

-continued

```
        try
        {
        //     set port parameters
            serialPort.setSerialPortParams(9600,
SerialPort.DATABITS_8,
    SerialPort.STOPBITS_1,
    SerialPort.PARITY_NONE);
        }
        catch (UnsupportedCommOperationException e) { }
}
public void run( )
{
    try
    {
        while (true)
        {
            if(readBuffer.length( ) >0)
            {
        System.out.println(defaultPort+“:Read:”+readBuffer.toString( ));
                saveMessage(readBuffer.toString( ));
                readBuffer =
(StringBuffer)readBuffer.delete(0,readBuffer.length( ));
            }
            Thread.sleep(1000);
        }
    }
    catch (InterruptedException e) { }
}
public void serialEvent(SerialPortEvent event)
{
    switch (event.getEventType( ))
    {
        case SerialPortEvent.BI:
        case SerialPortEvent.OE:
        case SerialPortEvent.FE:
        case SerialPortEvent.PE:
        case SerialPortEvent.CD:
        case SerialPortEvent.CTS:
        case SerialPortEvent.DSR:
        case SerialPortEvent.RI:
        case SerialPortEvent.OUTPUT_BUFFER_EMPTY:
        break;
        case SerialPortEvent.DATA_AVAILABLE:
        try
        {
            while(inputStream.available( ) > 0)
            {
                int numBytes = inputStream.read( );
                readBuffer.append(numBytes);
            }
        } catch (IOException e) { }
        break;
    }
}
public void saveMessage (String message)
{
    Connection con = null;
    CallableStatement cstmt = null;
    ResultSet rs = null;
    String query = “{call InsertDetectionLog(?,?)}”;
    int status = 0;
    try
    {
        message = readBuffer.toString( );
        System.out.println(“Parsing message...”);
        if(message.indexOf(“25597”) !=−1 && message.length( ) > 8)
        {
            //newsHubID =
message.substring(message.indexOf(“25597”)
+6,message.indexOf(“25597”)+8);
            if(message.indexOf(“25582”)!=−1)
            {
                status = 1;
            }
            if(message.length( ) > 12)
            {
                String malfunction =
message.substring(message.indexOf(“25597”)
+9,message.indexOf(“25597”)+11);
                System.out.println(“parsing for
```

-continued

```
malfunction...”+malfunction);
            if(malfunction.equalsIgnoreCase(“16”))
            {status = 2;}
        }
    }
    if(DataValidator.isEmpty(newsHubID))
    {
        throw new Exception(“NEWS HUB ID cannot be empty.”);
    }
    if(status == 0)
    {
        throw new Exception(“Status cannot be ZERO.”);
    }
    System.out.println(“NEWS HUB ID:”+newsHubID+” STATUS
ID:”+status);
    System.out.println(“BEGIN inserting into database....”);
    con = DataAccessor.getConnection( );
    cstmt = con.prepareCall(query);
    cstmt.setInt(1, Integer.parseInt(newsHubID));
    cstmt.setInt(2, status);
    cstmt.execute( );
    System.out.println(“END inserting into database....”);
  }
  catch(NumberFormatException e)
  {
  }
  catch(SQLException e)
  {
  }
  catch(Exception e)
  {
  }
  finally
  }
    DataAccessor.close(cstmt, null, con);
  }
 }
}
```

If an appropriate wrong way alert message is received and confirmed, the application/database server 26 running the customized software breaks the binary message down into different fields and inserts the data into a database of the application/database server (e.g., HP DL360 SQL database server). As can be seen in FIG. 1, the special purpose workstation computer 28 (e.g., Dell) programmed with the application software to run the associated programs is connected to the application/database server 26. The special purpose application/database server houses a web application (e.g., a Java web application built from Apache freeware) that pings the application/database server database (e.g., SQL) every predetermined time interval (e.g., 3 seconds, 10 seconds, 1 second, 5 seconds) for changes to the status of any alerts as indicated in a corresponding field or table in the database.

A video monitor 30 (e.g., 3'×2' video display wall, 40" NEC LCD(s)) is connected to the workstation computer 28. Upon receipt of a confirmed alarm input into the application/database server 26 database from a communication controller 14 in the field, the application/database server running the web application directs the video monitor to zoom into the specific site location. The system's special purpose computer (e.g., server 26, workstation computer 28) causes a speaker within the workstation computer or otherwise coupled to the special purpose computer to sound an audible alarm and the video monitor to display an alert banner with the specific site location. In addition, the video monitor 30 displays communication and hardware status of each site in real time as would readily be understood by a skilled artisan. While not being limited to a particular theory, the code below represents an exemplary computer program segment for directing the application/database server to perform the functions discussed above.

```
PlayWave.java
package com.tcore.hctra.wwd;
import java.io.File;
import java.io.IOException;
import java.sql.CallableStatement;
import java.sql.Connection;
import java.sql.ResultSet;
import java.sql.SQLException;
import javax.sound.sampled.AudioFormat;
import javax.sound.sampled.AudioInputStream;
import javax.sound.sampled.AudioSystem;
import javax.sound.sampled.DataLine;
import javax.sound.sampled.FloatControl;
import javax.sound.sampled.LineUnavailableException;
import javax.sound.sampled.SourceDataLine;
import javax.sound.sampled.UnsupportedAudioFileException;
import org.apache.log4j.Category;
import com.tcore.util.DataAccessor;
public class PlayWave extends Thread
{
  Category log = Category.getInstance(“com.tcore.hctra.wwd.PlayWave”);
  private static String filename = “buzzthruloud.wav”;
  private Position curPosition;
  private final int EXTERNAL_BUFFER_SIZE = 524288; // 128Kb
  public static void main(String[ ] args)
  {
    if(args != null && args.length > 0)
    {
      filename = args[0];
      System.out.println(“args[0]:”+args[0]);
      PlayWave playWave = new PlayWave(args[0]);
      playWave.start( );
    }
    else
    {
      PlayWave playWave = new PlayWave( );
      playWave.start( );
    }
  }
  enum Position
  {
    LEFT, RIGHT, NORMAL
  };
  public PlayWave( ) {
    curPosition = Position.NORMAL;
  }
  public PlayWave(String wavfile) {
    filename = wavfile;
    curPosition = Position.NORMAL;
  }
  public PlayWave(String wavfile, Position p) {
    filename = wavfile;
    curPosition = p;
  }
  public void run( ) {
    try
    {
      while(true)
      {
        if(checkForWrongWayDetection( ))
        {
          log.debug(“playing”wav file...”);
          File soundFile = new File(filename);
          if (!soundFile.exists( )) {
            System.err.println(“Wave file not
found: ” + filename);
            return;
          }
          AudioInputStream audioInputStream = null;
          try {
            audioInputStream =
AudioSystem.getAudioInputStream(soundFile);
          } catch (UnsupportedAudioFileException e1) {
            e1.printStackTrace( );
            return;
          } catch (IOException e1) {
            e1.printStackTrace( );
            return;
          }
          AudioFormat format =
```

-continued

```
audioInputStream.getFormat( );
                SourceDataLine auline = null;
                DataLine.Info info = new
DataLine.Info(SourceDataLine.class, format);
                try {
                    auline = (SourceDataLine)
AudioSystem.getLine(info);
                    auline.open(format);
                } catch (LineUnavailableException e) {
                    e.printStackTrace( );
                    return;
                } catch (Exception e) {
                    e.printStackTrace( );
                    return;
                }
                if
(auline.isControlSupported(FloatControl.Type.PAN)) {
                    FloatControl pan = (FloatControl)
auline
      .getControl(FloatControl.Type.PAN);
                    if (curPosition == Position.RIGHT)
                        pan.setValue(−1.0f);
                    else if (curPosition == Position.LEFT)
                        pan.setValue(−1.0f);
                }
                auline.start( );
                int nBytesRead = 0;
                byte[ ] abData = new
byte[EXTERNAL_BUFFER_SIZE];
                try {
                    while (nBytesRead != −1) {
                        nBytesRead =
audioInputStream.read(abData, 0, abData.length);
                        if (nBytesRead >= 0)
                            auline.write(abData, 0,
nBytesRead);
                    }
                } catch (IOException e) {
                    e.printStackTrace( );
                    return;
                } finally {
                    auline.drain( );
                    auline.close( );
                }
                log.debug("done playing wav file...");
            }
            Thread.sleep(1000);
        }
    }
    catch(InterruptedException e)
    {
    }
}
private boolean checkForWrongWayDetection( )
{
    Connection con = null;
    CallableStatement cstmt = null;
    ResultSet rs = null;
    String query = "{call SelectWrongWayIncidents( )}";
    boolean detection = false;
    try
    {
        con = DataAccessor.getConnection( );
        cstmt = con.prepareCall(query);
        log.debug("Querying for wrong way incidents...");
        rs = cstmt.executeQuery( );
        if(rs.next( ))
        {
            log.debug("found wrong way incidents...");
            detection = true;
        }
        else
        {
            log.debug("no wrong way incidents found...");
        }
    }
    catch(SQLException e)
    {
        e.printStackTrace( );
    }
```

-continued

```
    catch(Exception e)
    {
        e.printStackTrace( );
    }
    finally
    {
        DataAccessor.close(cstmt,rs,con);
    }
    return detection;
  }
}
```

The Wrong Way Detection System preferably also includes features that operate cameras 32 and dynamic message signs 34 (e.g., electronic road signs, electronic billboards, traffic warning signs) above or near the monitored road, as well as hardware/communication testing functionality. For example, the application/database server 26 hosted web application programs the specialized application/database server to interface with a closed circuit television (CCTV) application server to hook into a preset for accessing specific cameras based on detection location. These CCTV cameras pan towards the detection site once an alarm is activated so that dispatchers can track a wrong way vehicle and relay information to first responders. In a specific application of this example, application programming interface (API) from Chameleon 360 allows a web application to activate the pan, tilt and zoom (PTZ) commands for each camera.

Warning messages conveyed to other drivers on the dynamic message signs 34 is displayed in automated incident response plans based on the direction of travel and location of the detection. For example, the application/database server 26 hosted web application programs the specialized application/database server to interface with the dynamic message signs 34 located near the triggered radar detector 12 to warn nearby drivers of a motorist traveling on the road in the wrong direction. Most preferably the dynamic message signs also indicate the lane the wrong way motorist is traveling in real time.

Regarding the testing hardware and communication functionality, the specialized application/database server 26 customized by the system software communicates with each radar detector 12 once per minute to confirm proper operation and also reverses the polarity of each detector once every hour to confirm that vehicles traveling in the correct direction are being detected. For example, the application/database server 26 hosted web application programs the specialized application/database server to interface with the communication controllers 14 to send commands to reverse the polarity of the radar detectors 12 in the corresponding detection zone of each site. Returned detection data bypasses the application/database server database and is sent directly to the application/database server web application log as a text file. The server is programmed by its web application to then verify that 'detection' data is being received from the field. This "belt-and-suspenders" approach and active system management allows the system 10 to continuously confirm that each site has working communications and operating hardware.

The Wrong Way Detection System described by example herein has been credited with detecting vehicles traveling in the wrong direction on numerous occasions since its commission. On each of those occasions, law enforcement was quickly dispatched and able to stop those vehicles before any incident occurred.

While the invention has been described in detail and with reference to specific examples thereof, it will be apparent to one skilled in the art that various changes and modifications can be made therein without departing from the spirit and scope thereof. It is understood, therefore, that this invention is not limited to the particular embodiments disclosed, but it is intended to cover modifications within the spirit and scope of the present invention. Without further elaboration the foregoing will so fully illustrate my invention that others may, by applying current or future knowledge, readily adapt the same for use under various conditions of service.

What is claimed is:

1. A detection system for detecting vehicles traveling the wrong way along a roadway, the system comprising:

a plurality of wrong way detection stations deployed at a plurality of detection sites at respective longitudinally spaced apart locations adjacent a roadway, each wrong way detection station monitoring a lane of the roadway for vehicles traveling the wrong way along the lane, said wrong way detection station detecting a vehicle traveling the wrong way along the lane and transmitting a wrong way alert upon the detection;

a detection communicator at each of the plurality of detection sites, including the detection site with said wrong way detection station that transmitted the wrong way alert, the detection communicator communicatively coupled to said wrong way detection station to receive the wrong way alert, said detection communicator transmitting an alarm signal based on the wrong way alert;

a receiver terminal located at a central location that receives the transmitted alarm signal from the detection communicator as a wrong way detection alarm message; and a special purpose computer communicatively coupled with the receiver terminal, said special purpose computer programmed by computer programming software to interface with said receiver terminal to detect the wrong way detection alarm message and monitor the vehicle traveling the wrong way that was detected by said wrong way detection station, said special purpose computer communicating the wrong way traveling vehicle whereabouts to enforcement personnel.

2. The detection system of claim 1, further comprising a database communicatively coupled with the special purpose computer for monitoring the wrong way traveling vehicle based on a plurality of the detected wrong way detection alarm messages corresponding to the vehicle traveling the wrong way.

3. The detection system of claim 1, each of said wrong way detection stations including a radar detector for detecting the vehicle traveling the wrong way along the lane.

4. The detection system of claim 1, said detection communicator including a communication controller coupled to each of said wrong way detection stations at the detection site to control communication of the transmitted wrong way alerts from any of said coupled wrong way detection stations to said receiver terminal, and a data transmitter for transmitting the alarm signal to said receiver terminal.

5. The detection system of claim 1, said receiver terminal being a receiver/port terminal server.

6. The detection system of claim 1, said detection communicator at detection site communicating the alarm signal to said receiver terminal located at the central location via fiber optic cables.

7. The detection system of claim 1, said special purpose computer including a special purpose application/database server and a special purpose workstation.

8. The detection system of claim 1, said special purpose computer including a speaker for sounding an audible alarm upon detection of the wrong way detection alarm message.

9. The detection system of claim 1, further comprising a plurality of cameras and a video monitor, said plurality of cameras located adjacent the roadway near the wrong way detection station that detected the vehicle traveling the wrong way and recording video images of the vehicle based on the location of the detecting wrong way detection station, said video monitor displaying the recorded video images of the vehicle traveling the wrong way.

10. The detection system of claim 1, further comprising dynamic message signs located adjacent the roadway near the detection sites warning oncoming traffic of the vehicle traveling on the road in the wrong direction.

11. The method of claim 10, further comprising monitoring the wrong way traveling vehicle based on a plurality of the detected wrong way detection alarm messages detected from the receiver terminal corresponding to the vehicle traveling the wrong way and stored in a database of a special purpose computer.

12. The method of claim 10, further comprising sounding an audible alarm upon detection of the wrong way detection alarm message.

13. The method of claim 10, further comprising displaying video images of the vehicle traveling the wrong way.

14. The method of claim 10, further comprising warning oncoming traffic of the vehicle traveling on the road in the wrong direction.

15. A method for detecting vehicles traveling the wrong way along a roadway, the method comprising:

a) monitoring a roadway for vehicles traveling the wrong way along the roadway with a plurality of wrong way detection stations deployed at a plurality of detection sites at respective longitudinally spaced apart locations adjacent the roadway;

b) detecting a vehicle traveling the wrong way along the lane with a detecting one of the wrong way detecting stations, and transmitting a wrong way alert upon the detection by the wrong way detection station;

c) receiving the wrong way alert from the detecting wrong way detection station at the detection site with a detection communicator;

d) converting the wrong way alert into an alarm signal and transmitting the alarm signal with data based on the wrong way alert;

e) receiving the transmitted alarm signal at a central location receiver terminal remote from the detection site as a wrong way detection alarm message;

f) detecting the wrong way detection alarm message from the receiver terminal and monitoring the vehicle traveling the wrong way that was detected by the wrong way detection station; and g) communicating the wrong way traveling vehicle whereabouts to enforcement personnel.

* * * * *